US012549210B2

(12) United States Patent
Arora et al.

(10) Patent No.: US 12,549,210 B2
(45) Date of Patent: Feb. 10, 2026

(54) STAGED MITIGATION OF LOCAL INTERFERENCE TO WIRELESS COMMUNICATIONS

(71) Applicant: ZEBRA TECHNOLOGIES CORPORATION, Lincolnshire, IL (US)

(72) Inventors: Harish Arora, Brampton (CA); Chu Pang Alex Ng, Markham (CA); Jialiang Tan, Toronto (CA); Benjamin Jean Limongi, Marseilles (FR); Jingyang Hu, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 23 days.

(21) Appl. No.: 18/386,468

(22) Filed: Nov. 2, 2023

(65) Prior Publication Data
US 2025/0150105 A1 May 8, 2025

(51) Int. Cl.
H04B 1/10 (2006.01)
H04B 17/318 (2015.01)
H04L 1/00 (2006.01)

(52) U.S. Cl.
CPC ......... *H04B 1/1036* (2013.01); *H04B 17/328* (2023.05); *H04L 1/0026* (2013.01); *H04B 2001/1072* (2013.01)

(58) Field of Classification Search
CPC ............... H04B 1/1036; H04B 17/328; H04B 2001/1072; H04L 1/0026
USPC .......................................................... 375/350
See application file for complete search history.

(56) References Cited

U.S. PATENT DOCUMENTS

| 7,010,443 | B2* | 3/2006 | Torin ..................... G01R 29/26 |
| | | | 702/69 |
| 7,714,698 | B2 | 5/2010 | Kaplan |
| 9,781,735 | B2* | 10/2017 | Comsa .............. H04W 72/1215 |
| 10,015,153 | B1* | 7/2018 | Dotan .................... G06F 21/316 |
| 2006/0030356 | A1 | 2/2006 | Haub et al. |
| 2012/0140804 | A1* | 6/2012 | Corral ................... H04L 1/0001 |
| | | | 375/224 |
| 2015/0036514 | A1 | 2/2015 | Zhu et al. |
| 2015/0127823 | A1 | 5/2015 | Moeller et al. |
| 2015/0215947 | A1 | 7/2015 | Kaukovuori et al. |

OTHER PUBLICATIONS

International Search Report and Written Opinion for International Patent Application No. PCT/US2024/054081 mailed on Jan. 21, 2025.

* cited by examiner

*Primary Examiner* — Helene E Tayong

(57) ABSTRACT

A method includes: at a processor of a computing device having a first communications interface and a second communications interface, controlling the first communications interface to transmit data; at the processor, determining that the second communications interface is active concurrently with data transmission by the first communications interface; obtaining, at the processor, a performance metric corresponding to the second communications interface; in response to determining that the performance metric is below a threshold, selecting a mitigation action at the processor; and controlling the first communications interface according to the selected mitigation action.

13 Claims, 5 Drawing Sheets

STAGED MITIGATION OF LOCAL
INTERFERENCE TO WIRELESS
COMMUNICATIONS

BACKGROUND

Certain wireless communications technologies may make use of adjacent or overlapping frequency bands. Implementing more than one of such wireless communications technologies on a given computing device may therefore lead to reduced performance when both technologies are active.

BRIEF DESCRIPTION OF THE SEVERAL
VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
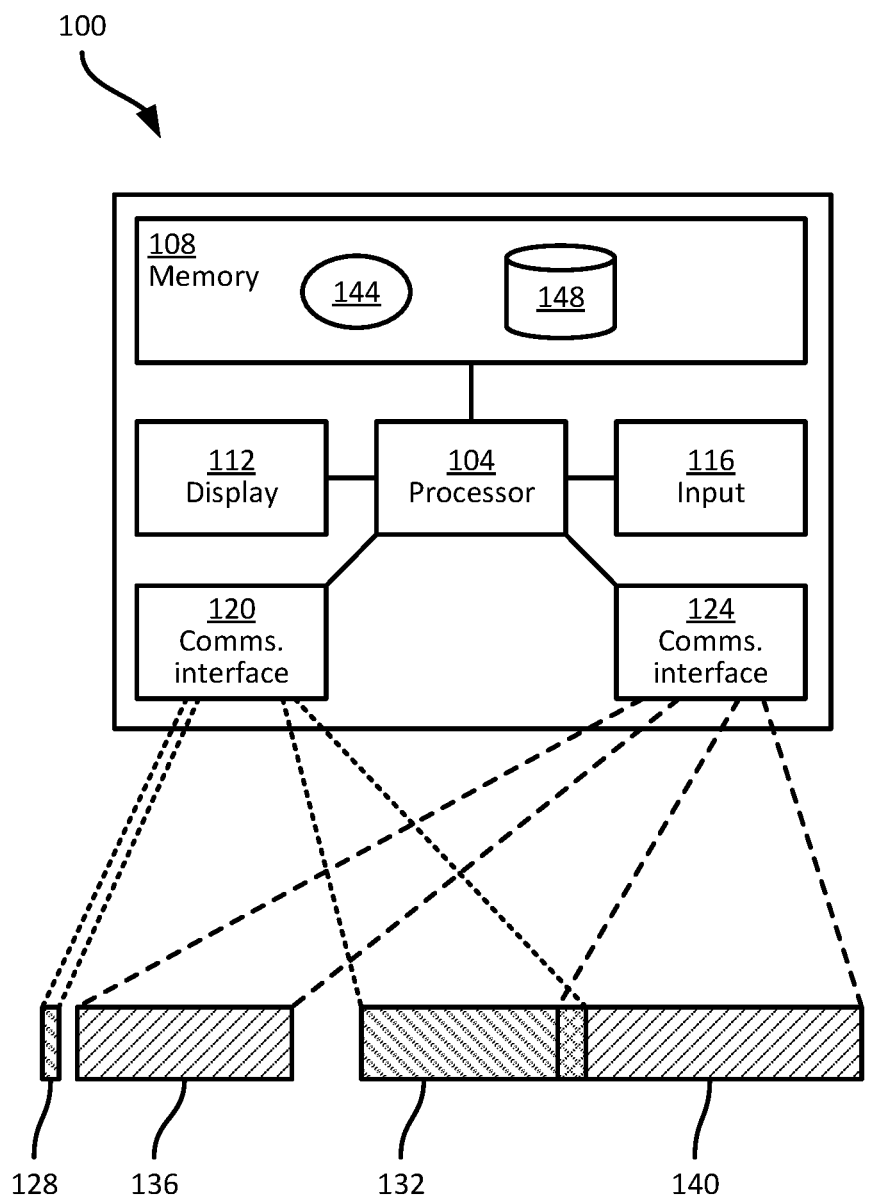
FIG. 1 is a diagram of a computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: at a processor of a computing device having a first communications interface and a second communications interface, controlling the first communications interface to transmit data; at the processor, determining that the second communications interface is active concurrently with data transmission by the first communications interface; obtaining, at the processor, a performance metric corresponding to the second communications interface; in response to determining that the performance metric is below a threshold, selecting a mitigation action at the processor; and controlling the first communications interface according to the selected mitigation action.

Additional examples disclosed herein are directed to a computing device, comprising: a first communications interface; a second communications interface; and a processor connected with the first communications interface and the second communications interface, the controller configured to: control the first communications interface to transmit data; determine that the second communications interface is active concurrently with data transmission by the first communications interface; obtain a performance metric corresponding to the second communications interface; in response to determining that the performance metric is below a threshold, select a mitigation action at the processor; and control the first communications interface according to the selected mitigation action.

Further examples disclosed herein are directed to a method in a computing device having a processor, a first communications interface, and a second communications interface, the method comprising: storing a prioritized sequence of mitigation actions; in response to initiating data transmission from the first communications interface, determining that the second communications interface is receiving data using a frequency band susceptible to interference from the first communications interface; and applying at least one mitigation action from the prioritized sequence of mitigation actions until a performance metric associated with the second communications interface meets a threshold.

FIG. 1 is a diagram of a computing device 100 (also referred to herein as the device 100), such as a handheld computer, a smartphone, a barcode scanner, a tablet computer, or the like. The device 100 can be implemented in a wide variety of form factors in addition to those mentioned above. For example, in some embodiments the device 100 can be deployed in a fixed position in a facility, rather than as a mobile device.

The device 100 includes a processor 104 (e.g., a central processing unit (CPU), graphics processing unit (GPU), and/or other suitable control circuitry, microcontroller, or the like), interconnected with a non-transitory computer readable storage medium, such as a memory 108. The memory 108 includes a suitable combination of volatile memory (e.g. Random Access Memory or RAM) and non-volatile memory (e.g. read only memory or ROM, Electrically Erasable Programmable Read Only Memory or EEPROM, flash memory). The memory 108 can store computer-readable instructions, execution of which by the processor 104 configures the processor 104 to perform various functions in conjunction with the other components of the computing device 100.

The device 100 can also include a display 112 and/or other suitable output device, such as a speaker. The device 100 can further include an input device 116 such as a touch panel integrated with the display 112, a keypad, a microphone, and/or other suitable inputs. In some examples, the device 100 can also include one or more sensors, such as an image sensor (e.g., a camera implemented via a metal-oxide-semiconductor-based sensor panel and optics assembly).

The computing device 100 also includes a first communications interface 120, and a second communications interface 124. The communications interfaces 120 and 124 enable the device 100 to exchange data with other devices. In some embodiments, the communications interfaces 120 and 124 implement different radio access technologies and/or communications standards. For example, the first communications interface 120 in this example includes a short-range interface, such as a radio frequency identification (RFID) interface. The interface 120 can therefore capture data from RFID tags or the like by transmitting interrogation signals to such tags. The interface 120 can also, in some examples, write data to RFID tags, or otherwise transmit data to another device. The interface 120, as will be apparent to those skilled in the art, therefore includes one or more antennas, as well as a microcontroller or other circuitry configured to receive data from the processor 104 and transmit the data via the antenna(s), and/or receive data via the antenna(s) and provide the received data to the processor 104.

The interface 124, in this example, is a wireless wide-area network (WWAN) communications interface, e.g., implementing a communications standard such as 4G/Long Term Evolution (LTE), 5G, or the like. The interface 124 therefore includes one or more antennas, as well as a microcontroller or other circuitry configured to receive data from the processor 104 and transmit the data via such antenna(s), and/or to receive data via the antenna(s) and provide the received data to the processor 104.

The device 100 can perform a wide variety of functions involving the interfaces 120 and 124. For example, the device 100 can be configured to operate as an RFID reader via the interface 120, capturing product identifiers or other data from objects such as parcels. Data captured via the interface 120 can be transmitted to other computing devices via the interface 124.

The components of the device 100 can be supported within a housing, which can also support a power source (not shown) such as a battery in some examples. In some examples, the communications interface 120 can be contained in an accessory housing that can be removably coupled to a primary housing containing the remainder of the components shown in FIG. 1. In such examples, the accessory housing and the primary housing can include respective physical interfaces (e.g., electrical contacts such as pogo pins or the like) configured to engage with each other to place the interface 120 in communication with the processor 104.

The communications interfaces 120 and 124 can be configured to transmit and receive data in a variety of frequency bands, depending on the communications standards implemented by each of the interfaces 120 and 124. In this example, the interface 120 is an ultra high frequency (UHF) RFID interface, and can transmit and receive data using a first frequency band 128, e.g., 865-868 MHz, and a second frequency band 132, e.g., 902-928 MHz. As will be apparent to those skilled in the art, the band 128 is the European UHF RFID band, and the band 132 is the North American UHF RFID band. The interface 120 may also communicate using other frequency bands in addition to those shown in FIG. 1.

The interface 124 is a cellular interface (e.g., for 4G and/or 5G communications), and can receive data using a first frequency band 136, e.g., 869-894 MHz, and a second frequency band 140, e.g., 925-960 MHz. As will be apparent to those skilled in the art, the band 136 corresponds to the downlink portion of Band 5 for 4G and 5G communications, and the band 140 corresponds to the downlink portion of Band 8 for 4G and 5G communications.

As seen in FIG. 1, the bands 132 and 140 overlap, while the bands 128 and 132 are adjacent to the band 136. The lower end of the band 132 is separated by about 8 MHz from the upper end of the band 136, and the upper end of the band 128 is separated by about 1 MHz from the lower end of the band 136. Therefore, transmission of data by the interface 120 concurrently with receipt of data by the interface 124 may result in a reduction in sensitivity (also referred to as de-sense) at the interface 124. For example, if the interface 120 is transmitting using the band 132 while the interface 124 is receiving using the band 140, data reception at the interface 124 may be negatively affected due to interference from the transmissions generated by the interface 120. Various other frequency bands may also be employed by the interfaces 120 and 124, and it will be understood that the bands shown in FIG. 1 are provided for illustrative purposes.

Local interference at a given device, such as interference at the interface 124 originating from the interface 120, can be mitigated to some degree by device design, e.g., by physically arranging the interfaces 120 and 124 within the device 100 to increase the distance therebetween, by providing shielding between the interfaces 120 and 124, and the like. Such mitigations may only partially resolve interference, however. The interface 124 may also be configured to implement various responses to degraded signal quality, such as changing transmission and reception channels within a band, changing frequency bands, roaming between base stations, and the like. For interference originating from the same device, however, such as interference generated by the interface 120, those responses may be inadequate to restore sufficient sensitivity at the interface 124.

The device 100 is therefore configured to implement additional functionality to mitigate the impact of transmissions from the interface 120 on data reception at the interface 124. The memory 108 stores an application 144 that, when executed by the processor 104, configures the device 100 to alter the operation of the interface 120 under certain conditions, to mitigate performance impacts on the interface 124. The memory 108 can also store configuration data 148 for use during the execution of the application 144. The configuration data 148 can include, for example, a sequence of mitigation actions that the processor 104 can apply at the interface 120, in response to detecting reduced performance at the interface 124 that may be associated with concurrent operation of the interface 120. In other examples, the functionality implemented via the application 144 and configuration data 148 can be implemented via dedicated control hardware, such as an application-specific integrated circuit (ASIC) or the like.

Figure 2:
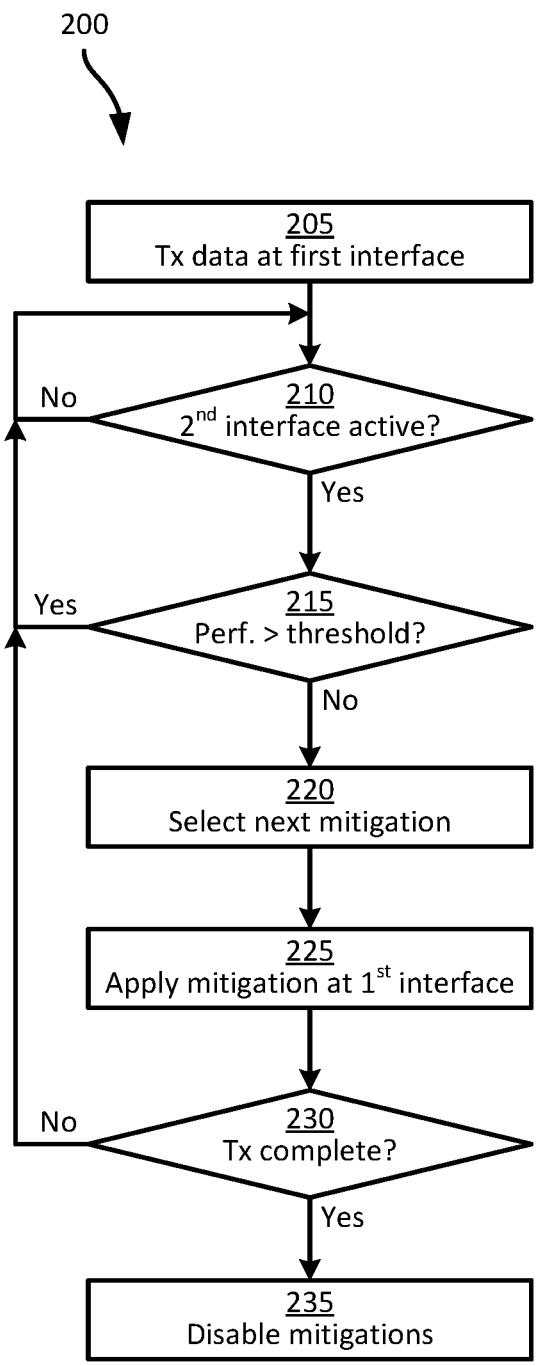
FIG. 2 is a flowchart of a method of mitigating local interference to wireless communication.

Turning to FIG. 2, a method 200 of mitigating locally-originated wireless interference (e.g., interference affecting one wireless communications interface of a device, originating from another wireless communications interface of the same device). The method 200 is described below in conjunction with its performance by the device 100, via execution of the application 144 by the processor 104. As will be understood from the discussion below, the method 200 can also be implemented by other computing devices with different combinations of communications interfaces than those mentioned in connection with FIG. 1.

At block 205, the processor 104 is configured to control the first interface 120 to transmit data, and/or to detect that the interface 120 has begun transmitting. For example, the processor 104 can send a command to the interface 120 to write certain data to an RFID tag, in some examples. In other examples, the processor 104 can control the interface 120 to send a tag interrogation signal, or the interface 120 can be configured to automatically send the tag interrogation signal periodically. As will be apparent from the discussion above, the transmission of signals from the interface 120 may result in sensitivity reduction at the interface 124, if the frequency band currently employed by the interface 120 is adjacent to or overlaps with the frequency band currently employed by the interface 124.

At block 210, in response to controlling the interface 120 to begin a transmission operation, the processor 104 is configured to determine whether the second communications interface 124 is active concurrently with data transmission by the first communications interface 120. For example, the processor 104 can be configured to determine whether the second interface 124 is receiving data substantially simultaneously with the transmission of data by the first interface 120.

In some examples, the determination at block 210 includes determining whether the interface 124 is receiving data (concurrently with transmission by the interface 120 initiated at block 205) using certain predetermined frequency bands. The interface 124 may support frequency bands other than the bands 136 and 140 shown in FIG. 1, and thus certain frequency bands may be less susceptible to interference from the interface 120. Further, the selection of which predetermined frequency bands to check for activity at block 210 can be based on which frequency band is currently in use by the interface 120, in some examples.

Figure 3:
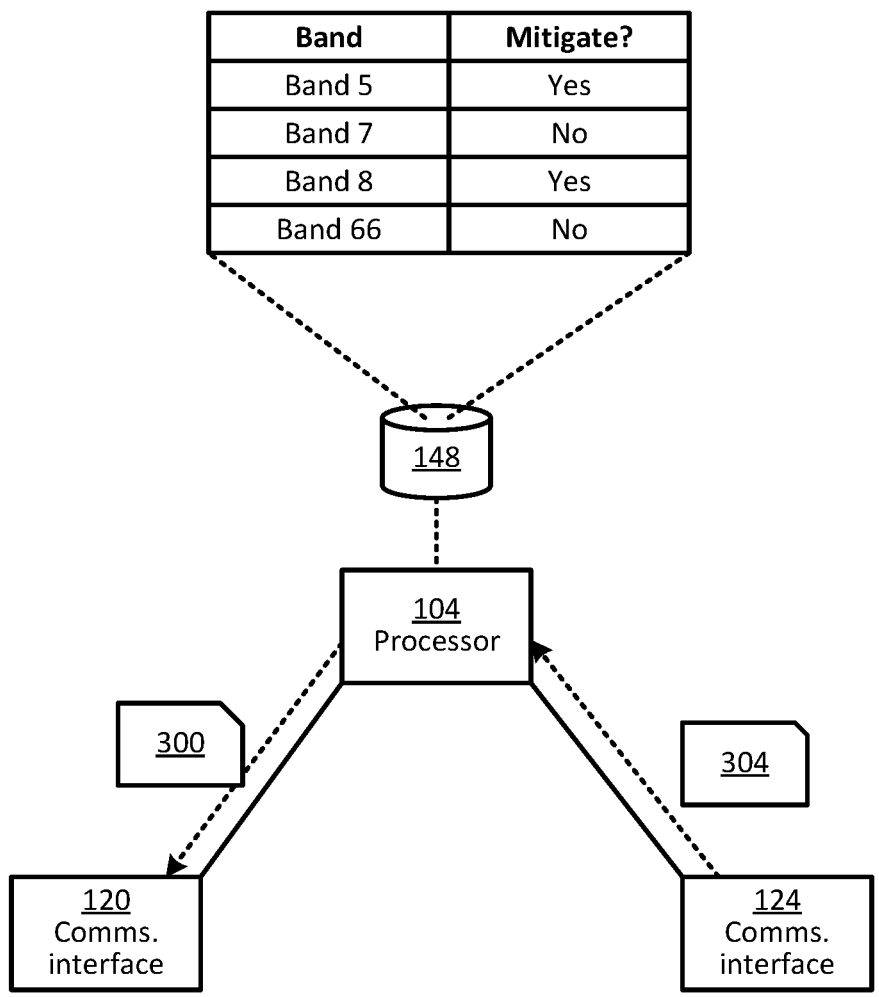
FIG. 3 is a diagram illustrating an example performance of blocks 205 and 210 of the method of FIG. 2.

Turning to FIG. 3, the processor 104 is shown performing blocks 205 and 210. For example, at block 205 the processor 104 can send a command 300 to the interface 120 to begin transmission (e.g., of an interrogation signal, or the like). At block 210, e.g., substantially simultaneously with block 205, the processor 104 can obtain an indication 304 of whether the interface 124 is currently receiving data. The indication 304 can also identify the frequency band used for such data reception. The configuration data 148 can include indications of whether to implement interference mitigation, corresponding to each frequency band supported by the interface 124. For example, as shown in FIG. 3, the interface 124 supports four bands (e.g., the 4G/5G bands 5, 7, 8, and 66), and the configuration data 148 indicates that the determination at block 210 is affirmative for the bands 5 and 8, and negative for the bands 7 and 66 (which have downlinks portions at about 2600 MHz and about 2100 MHz, respectively). The processor 104 can, in other words, compare the active frequency band from the indication 304 to the configuration data 148 to determine whether the second communications interface 124 is receiving data using a predetermined frequency band susceptible to interference by the first communications interface 120.

Returning to FIG. 2, when the determination at block 210 is negative, the processor 104 can terminate the performance of the method 200, or continue to assess the activity of the second interface 124 for as long as the first interface 120 is active. A negative determination at block 210 indicates that the current activity of the second interface 124 is not susceptible to interference from transmission by the first interface 120.

When the determination at block 210 is affirmative, the processor 104 proceeds to block 215. At block 215, the processor 104 can be configured to determining whether a performance metric corresponding to the second communications interface 124 meets a threshold. The determination at block 215 assesses whether interference from the interface 120 is likely to be currently impacting the reception performance of the interface 124. The determination at block 215 can be made by obtaining one or more performance metrics from the interface 124. An example performance metrics include a Reference Signal Received Power (RSRP), which indicates a signal strength (e.g., in dB) received at the interface 124 from a base station. Other example performance metrics that can be used at block 215 include a Received Signal Strength Indicator (RSSI), a Reference Signal Received Quality (RSRQ), and/or a Channel Quality Indicator (CQI). The configuration data 148 can include a threshold for each performance metric employed in a given implementation. For example, the configuration data 148 can define a threshold of −110 dB for RSRP, such that an RSRP of −112 dB results in a negative determination at block 215. When multiple performance metrics are employed at block 215, the determination at block 215 can be negative if any one of the metrics does not meet a corresponding threshold, for example.

When the determination at block 215 is affirmative, indicating that the performance metric associated with the second interface 124 meets the threshold, no mitigation action is needed, and the processor 104 can terminate the performance of the method 200, or return to block 205 and continue assessing the activity and performance of the interface 124 for as long as the interface 120 is actively transmitting data.

When the determination at block 215 is negative, the processor 104 proceeds to block 220. At block 220, the processor 104 is configured to select a mitigation action, and at block 225 the processor 104 is configured to apply the mitigation action selected at block 225 at the first interface 120. The configuration data 148 can define a prioritized sequence of mitigation actions, and the processor 104 can be configured to select and apply mitigation actions from the sequence at the interface 120 (e.g., through repeated performances of blocks 220 and 225), until the performance metric(s) associated with the second interface 124 meet the threshold from block 215. The mitigation actions, for example, can be prioritized in increasing order of performance impact on the first interface 120. The mitigation actions may negatively affect the performance (e.g., transmission range, data throughput, and the like) of the interface 120. The prioritization can be arranged such that the action having the highest priority (e.g., selected first) leads to a smaller reduction in performance at the interface 120 than the action having the lowest priority (e.g., selected last).

Figure 4:
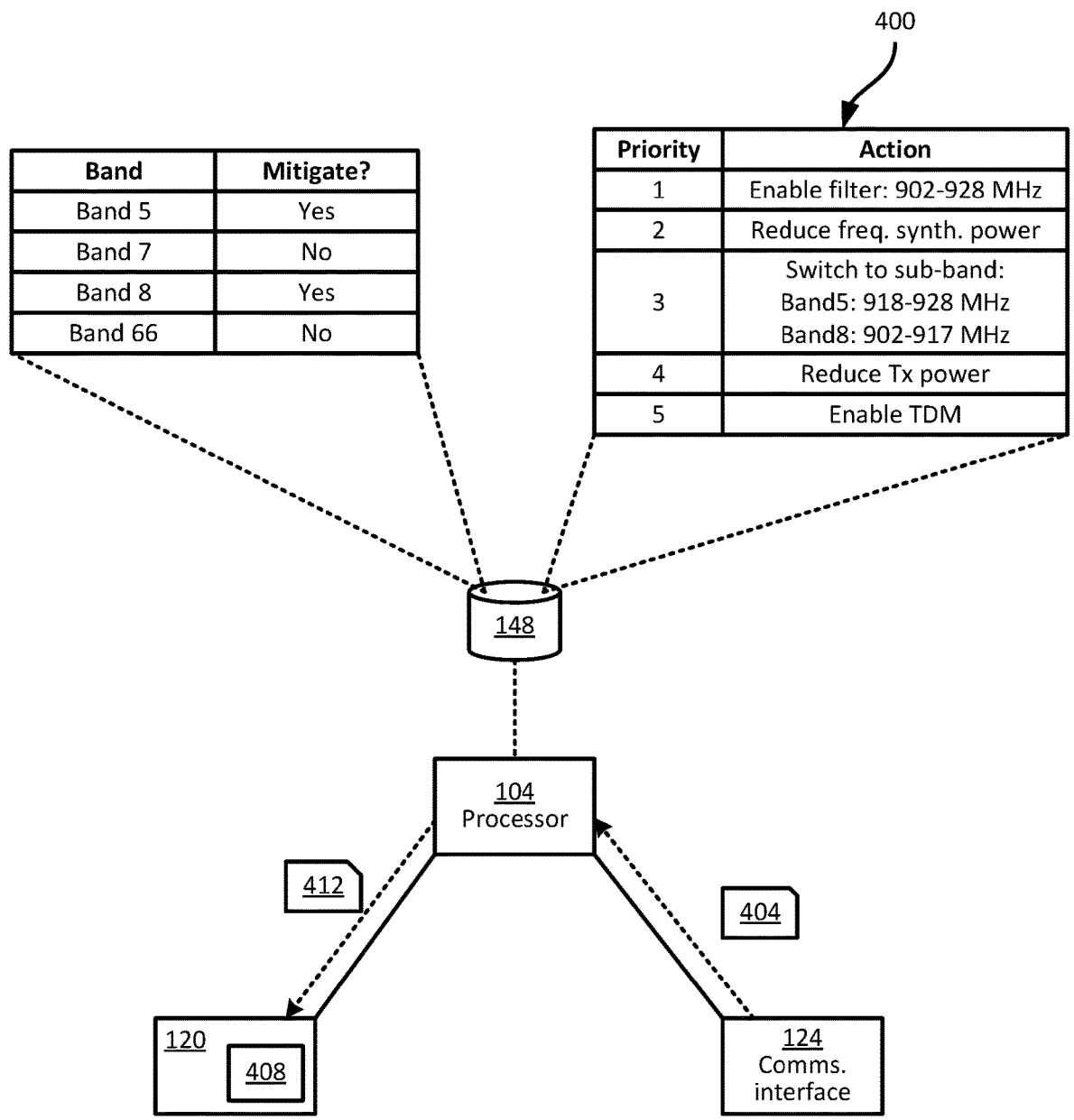
FIG. 4 is a diagram illustrating an example performance of blocks 215, 220, and 225 of the method of FIG. 2.

Turning to FIG. 4, an example sequence 400 of mitigation actions is shown, as defined in the configuration data 148. The mitigation actions can be stored in a variety of other formats beyond the tabular format shown in FIG. 4. Each mitigation action corresponds to a priority level, with the highest priority level, "1" in this example, being selected at the first instance of block 220 in a given performance of the method 200. In this example, therefore, the processor 104 is configured to retrieve a performance metric 404 (e.g., an RSRP) from the interface 124. When the performance metric 404 is below a predetermined threshold, the processor 104 is configured to select, from the sequence 400, the next highest-priority action. In this case, at the first performance of block 220, the processor 104 is configured to select the highest-priority mitigation action.

The action selected in this example performance of block 220 is to enable a bandpass filter 408 of the interface 120, e.g., with cutoff frequencies corresponding to the currently active band being used by the interface 120. For example, the cutoff frequencies can be 902 MHz and 928 MHz, corresponding to the band 132. At block 225, the processor 104 can send a command 412 to the interface 120 to enable the filter 408. The command 412 may include the cutoff frequencies, in some examples. The filter enabled at block 225 may reduce out-of-band noise generated by the interface 120, which may impact the performance of the interface 124.

Returning to FIG. 2, at block 230, the processor 104 is configured to determine whether the transmission from the interface 120 initiated at block 205 is complete. When the determination at block 230 is affirmative, indicating that the interface 120 is no longer active, at block 235 the processor 104 can be configured to disable any previously applied mitigations at the interface 120, and terminate the performance of the method 200.

When the determination at block 230 is negative, indicating that the interface 120 remains active, the processor 104 is configured to return to block 210, to determine whether the interface 124 remains active (e.g., using a frequency band susceptible to interference, as defined in the configuration data 148). When the determination at block 210 is affirmative (e.g., after having applied the first mitigation action at the preceding performance of block 225), the processor 104 is configured to assess the performance of the interface 124 at block 215 as discussed previously, e.g., by obtaining one or more updated performance metrics from the interface 124 and comparing the performance metrics to corresponding thresholds.

Figure 5:
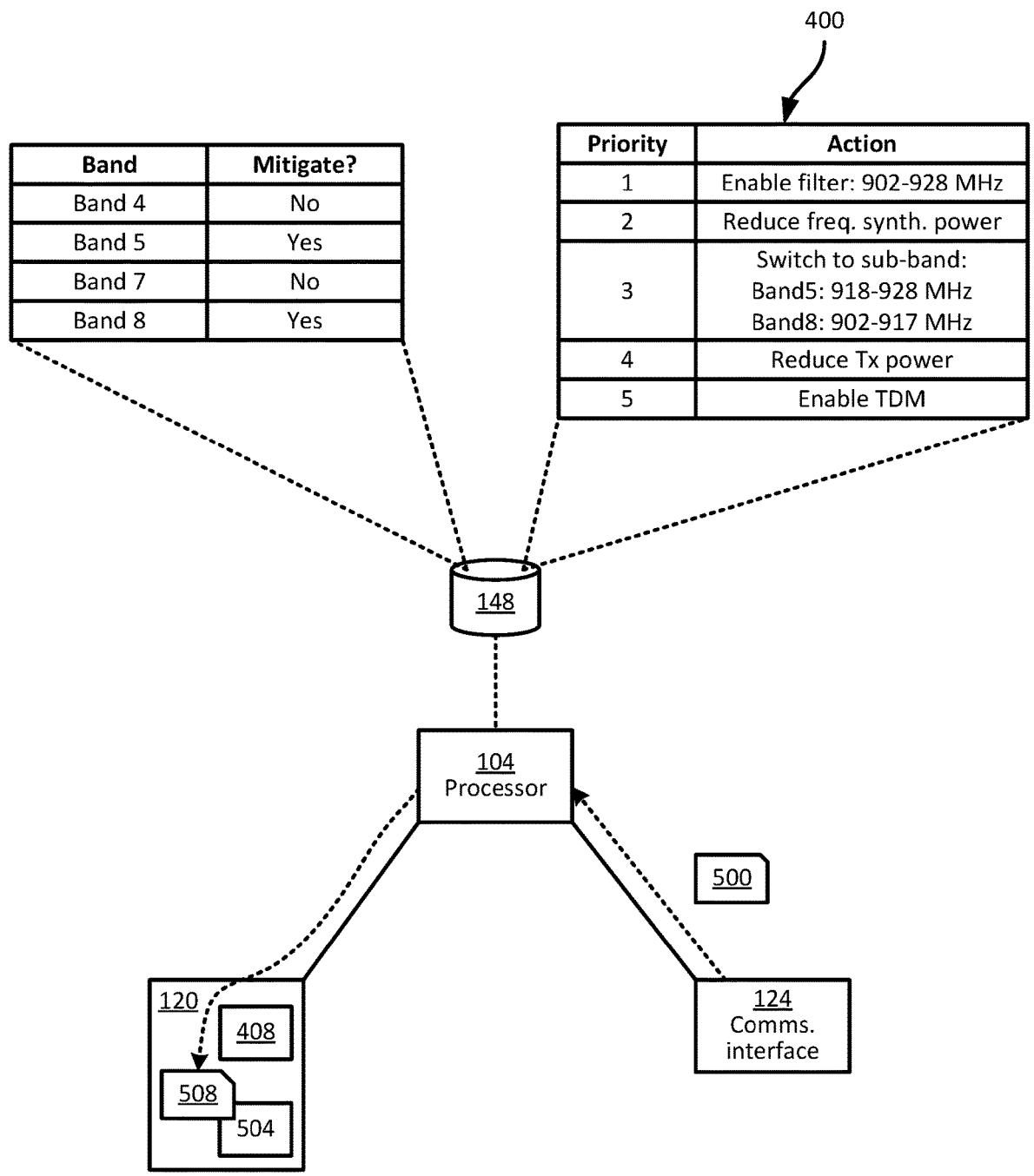
FIG. 5 is a diagram illustrating another example performance of blocks 215, 220, and 225 of the method of FIG. 2.

When the determination at this instance of block 215 is affirmative, the processor 104 returns to block 210, maintaining the previously applied mitigation (e.g., the bandpass filter mentioned above). When the determination at this instance of block 215 is negative, the processor 104 proceeds to block 220, to select the next mitigation action according to the prioritized sequence 400. In this example, as shown in FIG. 5, an updated performance metric 500 does not meet the threshold, and the determination at block 215 is therefore negative. At block 220, the processor 104 therefore selects the second mitigation action from the sequence 400.

The next mitigation action, in this example, is a reduction in power delivery to one or more frequency synthesizers 504 of the interface 120. For example, the processor 104 can reduce charge pump current for the frequency synthesizers. Reduction of power delivery to the frequency synthesizers 504 may reduce phase noise generated by the synthesizers, which may in turn reduce out-of-band transmissions at the antenna(s) of the interface 120. The configuration data 148 can specify current delivery settings corresponding to the mitigation action, e.g., as an absolute value, or as a relative value representing a reduction from a nominal current level supplied to the frequency synthesizers. At block 225, the processor 104 can, for example, send a command 508 to the interface 120 containing the adjusted power delivery to the frequency synthesizers 504.

The performance of blocks 215, 220, and 225 can therefore be repeated until either the interface 120 is no longer transmitting (e.g., an affirmative determination at block 230), or until the interface 124 is no longer receiving data using a frequency band susceptible to interference from the interface 120. Additional mitigation actions can therefore be applied to the interface 120, until all actions in the sequence 400 have been applied, and/or until the performance of the interface 124 meets the performance threshold at block 215.

The additional example mitigation actions shown in the sequence 400 include reducing the bandwidth available to the interface 120. For example, the sequence 400 can specify, as shown in FIGS. 4 and 5, a narrowed band for the interface 120 to use for transmissions, for each band used by the interface 124 that is susceptible to interference from the interface 120. Thus, when the interface 124 is receiving using the band 136, the mitigation action can limit the frequency band used by the interface 124 to a lower boundary of 918 MHz instead of 902 MHz. When the interface 124 is receiving using the band 140, on the other hand, the mitigation action can limit the frequency band used by the interface 124 to an upper boundary of 917 MHz instead of 928 MHz.

As will be apparent to those skilled in the art, the reduction of available bandwidth to the interface 120 may have a greater performance impact on the interface 124 than the reduction of power delivery to the frequency synthesizer(s) 504 and the use of the filter 408, but may also have a greater effect in mitigation interference at the interface 124.

The sequence 400 further includes, in this example, a mitigation action specifying a reduction in transmission power for the interface 120. The reduction can be specified as an absolute value, or as a fraction (e.g., a percentage, or the like) of a maximum transmission power of the interface 120. Reducing transmission power at the interface 120 may have a greater impact on the performance of the interface 120 than the previous mitigation actions, and the reduction in transmission power may therefore be prioritized below those actions. In some examples, the power reduction action can be defined in the sequence 400 by a plurality of stages. For example, the mitigation action can define a fractional reduction in transmission power (e.g., 10% or the like), as well as a lower performance threshold for the interface 120, such as a data throughput. The processor 104 can therefore, in applying the power reduction action at block 225, repeat the reduction in transmission power by 10% (or any other suitable step size), until the performance of the interface 120 falls to the lower performance threshold.

The sequence 400 also, in this example, includes a further mitigation action indicating the enablement of time-division multiplexing (TDM) between the interfaces 120 and 124. The processor 104 can be configured to transmit a command to both of the interfaces 120 and 124 to enable TDM. Thereafter, the interfaces 120 and 124 may communicate directly (although in some examples, such communication can be intermediated by the processor 104) to alternate transmission of data by the interface 120, and reception of data by the interface 124 in time. As will be apparent to those skilled in the art, the implementation of TDM may be effective in mitigating or eliminating interference from the interface 120 at the interface 124, but may also have a significant performance impact on either or both interfaces 120 and 124.

As will be apparent, the method 200 can also be performed to mitigate reduced reception sensitivity at the interface 120 caused by transmission at the interface 124. For example, the 4G/5G Band 20 uplink frequency band (832-862 MHz) is adjacent to the band 128. When the interface 124 transmits using Band 20 while the interface 120 receives data using the band 128, therefore, the processor 104 can perform the method 200 to mitigate interference caused by the interface 124. The configuration data 148 can define a separate sequence of actions from the sequence 400, e.g., because the available mitigation actions may be different between different interfaces. For example, the use of a narrowed frequency band for the interface 124 may be impractical, e.g., due to compatibility requirements between the interface 124 and network infrastructure. Such a mitigation action (e.g., the action with priority "3" in FIGS. 4 and 5) may therefore be omitted. In some examples, mitigation actions can include, for example, switching the interface 120 to an upper band (e.g., 915-921 MHz in the case of European UHF RFID, as contrasted with the primary European UHF RFID band of 865-868 MHz) when the interface 124 is actively transmitting data using 4G/5G Band 20.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   at a processor of a computing device having a first communications interface and a second communications interface, controlling the first communications interface to transmit data;
   at the processor, determining that the second communications interface is active concurrently with data transmission by the first communications interface;
   obtaining, at the processor, a performance metric corresponding to the second communications interface;
   in response to determining that the performance metric is below a threshold, selecting, at the processor, a mitigation action; and
   at the processor, controlling the first communications interface according to the selected mitigation action,
     wherein determining that the second communications interface is active includes determining that the second communications interface is receiving data using a predetermined frequency band susceptible to interference by the first communications interface.

2. The method of claim 1, wherein
   the mitigation action is a first mitigation action selected from a stored sequence of mitigation actions;
   the method further comprising:
   in response to controlling the first communications interface according to the first mitigation action, obtaining a further performance metric corresponding to the second communications interface; and
   when the further performance metric is below the threshold, selecting a subsequent mitigation action from the sequence.

3. The method of claim 2, further comprising:
   controlling the first communications interface according to the first and second mitigation actions.

4. The method of claim 1, wherein
   the selected mitigation action is selected from the group consisting of:
   enabling a bandpass filter at the first communications interface;

reducing power delivery to a frequency synthesizer of the first communications interface;
reducing a frequency band used by the first communications interface;
reducing a transmission power for the first communications interface; and
performing time-division multiplexing between the first communications interface and the second communications interface.

5. The method of claim 1, wherein
the performance metric is selected from the group consisting of:
a Reference Signal Received Power (RSRP);
a Reference Signal Received Quality (RSRQ); and
a Channel Quality Indicator (CQI).

6. A computing device, comprising:
a first communications interface;
a second communications interface; and
a processor connected with the first communications interface and the second communications interface, the processor configured to:
control the first communications interface to transmit data;
determine that the second communications interface is active concurrently with data transmission by the first communications interface;
obtain a performance metric corresponding to the second communications interface;
in response to determining that the performance metric is below a threshold, select a mitigation action at the processor; and
control the first communications interface according to the selected mitigation action,
wherein the processor is configured to determine that the second communications interface is active by determining that the second communications interface is receiving data using a predetermined frequency band susceptible to interference by the first communications interface.

7. The computing device of claim 6, wherein
the mitigation action is a first mitigation action selected from a stored sequence of mitigation actions; and
wherein the processor is further configured to:
in response to controlling the first communications interface according to the first mitigation action, obtain a further performance metric corresponding to the second communications interface; and
when the further performance metric is below the threshold, select a subsequent mitigation action from the sequence.

8. The computing device of claim 7, wherein
the processor is further configured to:
control the first communications interface according to the first and second mitigation actions.

9. The computing device of claim 6, wherein
the selected mitigation action is selected from the group consisting of:
enabling a bandpass filter at the first communications interface;
reducing power delivery to a frequency synthesizer of the first communications interface;
reducing a frequency band used by the first communications interface;
reducing a transmission power for the first communications interface; and
performing time-division multiplexing between the first communications interface and the second communications interface.

10. The computing device of claim 6, wherein
the performance metric is selected from the group consisting of:
a Reference Signal Received Power (RSRP);
a Reference Signal Received Quality (RSRQ); and
a Channel Quality Indicator (CQI).

11. The computing device of claim 6, wherein
the first communications interface includes a radio frequency identification (RFID) interface, and wherein the second communications interface includes a cellular interface.

12. A method in a computing device having
a processor, a first communications interface, and a second communications interface, the method comprising:
storing a prioritized sequence of mitigation actions;
in response to initiating data transmission from the first communications interface, determining that the second communications interface is receiving data using a frequency band susceptible to interference from the first communications interface; and
applying successive mitigation actions from the prioritized sequence of mitigation actions until a performance metric associated with the second communications interface meets a threshold.

13. The method of claim 12, further comprising:
in response to applying each of the successive mitigation actions from the prioritized sequence, obtaining the performance metric from the second communications interface.

* * * * *